INVENTOR.
JAMES F. SPIELMAN

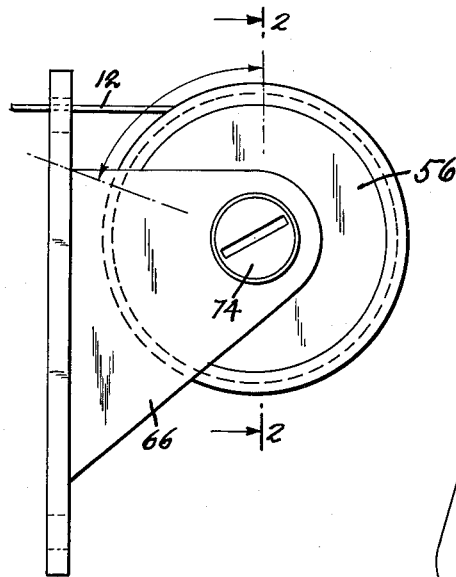
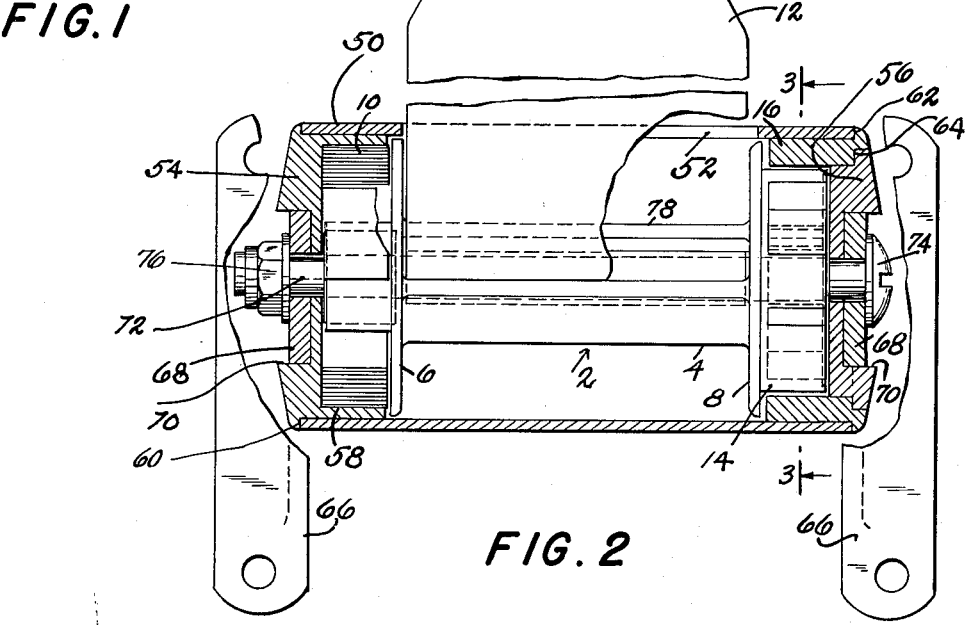

ATTORNEY

United States Patent Office 2,982,492
Patented May 2, 1961

2,982,492
SAFETY REEL

James F. Spielman, Bantam, Conn., assignor to Aerotec Industries, Inc., a corporation of Connecticut Filed Oct. 30, 1958, Ser. No. 770,751

4 Claims. (Cl. 242—107.4)

This invention is directed to an improvement in reels for use in connection with safety belts and harnesses and like equipment.

More specifically, the invention is directed to reels adapted for use by occupants of conveyances, such as aircraft, automobiles, and the like, to protect the occupants from being injured in the event of sudden deceleration of the conveyance, such as would occur in the event of a crash-landing or collision, for example.

Still more specifically, the invention is directed to an improved reel for safety belts and harnesses which is so constructed and arranged that, while the reel, which is provided with rewind mechanism, will permit the user to move about in normal fashion under normal conditions, the belt or harness, as the case may be, unwinding and rewinding, acceleration of the reel in an unwinding direction at a predetermined acceleration will cause the reel to be locked against continued rotation. For example, let it be assumed that the reel is employed in connection with safety belts for aircraft. The safety belt is wound upon and attached to the reel, and as the seat occupant moves about, the reel will unwind as belt tension is increased and rewind as the tension is eased. Assume, however, that the aircraft is rapidly decelerated, as in making a crash-landing, for instance; this, of course, will tend to throw the seat occupant forward and will accelerate the reel in an unwinding direction. Under such conditions the reel of this invention is locked against continued unwinding rotation.

The locking mechanism is of such a nature that, after the reel has been locked, it can be released by the seat occupant simply by merely relieving the tension on the belt or harness, which will allow the spring-loaded locking lugs, forming part of the locking mechanism, to retract so that the rewind mechanism can operate to restore the reel to normal.

More specifically, the present invention provides a reel particularly well adapted for the uses above mentioned in which the number of parts entering into the make-up of the reel has been reduced to a minimum commensurate with certainty of operation.

The reel comprises a rotatable spool upon which the belt or harness is wound, a rewind device for the spool, and locking mechanism for the spool, these parts or elements being enclosed in a housing including a mounting bracket or brackets, the entire assembly being held assembled by a single bolt, which functions also as the axle upon which the reel spool rotates and as an anchorage for one end of the rewind spring for the reel. The above mentioned as well as other novel features of the improved reel will be appreciated from a study of the description which follows taken in connection with the accompanying drawings, in which Fig. 1 is an end elevation of the reel;

Fig. 2 is a part-sectional view taken substantially along the line 2—2 of Fig. 1;

Figure 3:
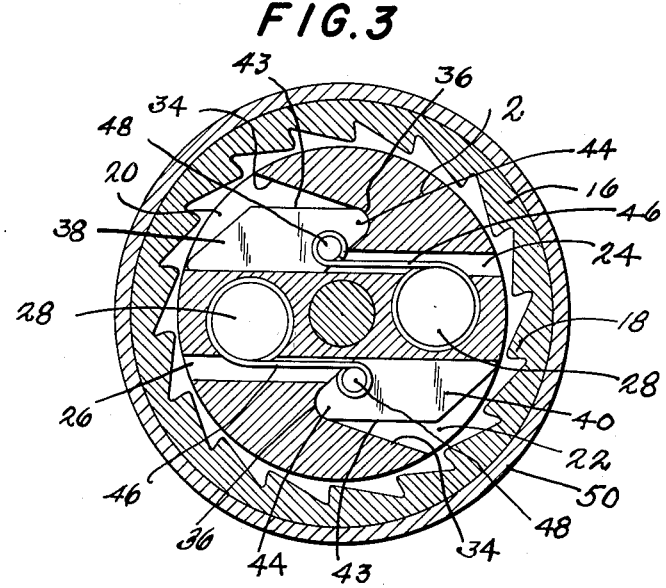
Fig. 3 is a section taken substantially on the line 3—3 of Fig. 2.

Referring to the drawings in detail, 2 designates the reel spool, which comprises barrel 4 and end flanges 6 and 8. Attached to the barrel 4 of the reel spool is one end of a rewind spring 10. The spring 10 is adapted to turn the reel spool in a clockwise direction, as viewed in Figs. 3 and 4.

12 designates the safety belt or harness, attached at its inner end to the barrel 4 of the reel spool so that, by tensioning the belt or harness, the reel spool will unwind, the spring 10 rewinding the spool when this tension is released, all of which will be understood.

The barrel 4 of the reel spool projects beyond the end of its flange 8, as illustrated in Fig. 2, this projecting portion of the barrel having been designated 14 for clarity of description.

Surrounding the projecting portion 14 of the spool barrel is a fixed locking ring or annulus 16, provided interiorly with teeth 18, uniformly spaced from each other.

Upon reference to Figs. 2 and 3 in particular, it will be seen that the face of projecting end 14 of the reel spool is provided with transverse grooves eccentric to the spool axis and extending inwardly from one edge of the spool end to a point short of the opposite edge, these grooves being designated 20 and 22. The face of the projecting end of the reel spool is also provided with narrower grooves 24 and 26. The four grooves are symmetrically disposed relatively to each other, so that the grooves 20 and 24 will be positioned to one side of the axis of rotation of the reel spool, while the grooves 22 and 26 will lie at the other side of this axis.

In addition to the grooves 20, 22, 24, and 26, the face of the spool projection 14 is provided with two depressions 28, also offset relatively to the axis of rotation of the reel spool, one at either side of this axis. A line joining the centers of the depressions 28 passes through the spool axis.

It is to be noted that the grooves 20, 22, 24, and 26 and the depressions 28 just referred to are preferably of the same depth.

Figure 4:
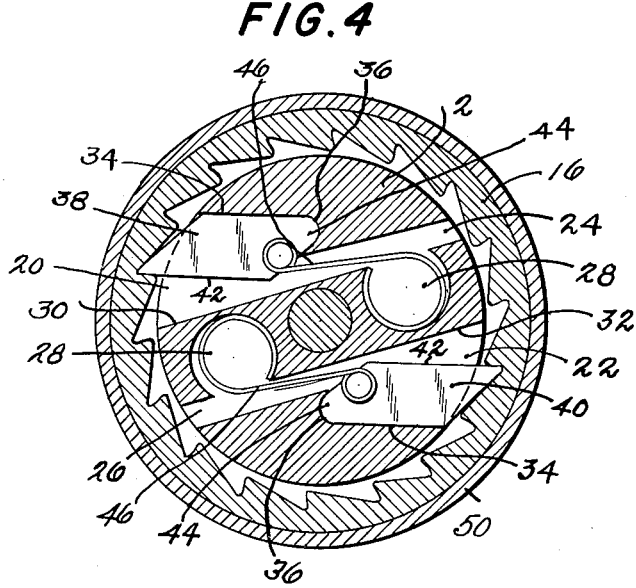
Fig. 4 is a view similar to Fig. 3 showing the locking mechanism in locking position.

From Figs. 3 and 4 it will be seen that the inner edges 30 and 32 of grooves 20 and 22, that is, the edges nearest to the axis of the spool, extend straight across the spool end in a chord-like fashion. The opposite edges of each of these grooves, however, extend at an angle to the edges 30 and 32 and are so shaped as to provide straight edges 34, merging into concaved or socket areas 36. These socket areas constitute the inner ends of the grooves 20 and 22 and are struck from centers which are at opposite sides of a line extending through the axis of rotation of the spool 2 at substantially right angles to the parallel, straight edges 30 and 32 of the grooves 20 and 22.

Disposed in the grooves 20 and 22 are locking pawls 38 and 40, respectively, which are to cooperate with the teeth 18 of the locking ring 16. It is to be noted that each of the locking pawls is straight-faced along its inner edge 42, so that normally the pawls will lie against the straight edges 30 and 32 of the grooves 20 and 22, as illustrated in Fig. 3.

The locking pawls in elevation, as illustrated in Figs. 3 and 4 for example, are roughly parallelograms, so that their outer edges 43, as viewed in these two figures of the drawings, are parallel to their inner edges 42. The inner corner 44 of each locking pawl abuts the inner end of the corresponding grooves 20 and 22 at the socket 36 formed in the rear wall or inner end of each of the grooves. The pawls are held in the normal positions shown in Fig. 3 by springs 46, with which each pawl is provided. For illustrative purposes these springs have been shown as flat springs looped at each end, the loop at one end of each spring being set into a depression or socket 48, formed in each of the locking pawls, while the loop at the other end of each spring sits in the depression 28, hereinabove referred to, in the spool end. The springs are extended between loop centers at installation into their respective depressions to draw the pawls 38 and 40 into their respective sockets 36 and simultaneously urge the pawls against the surfaces or walls 30 and 32 of the grooves 20 and 22.

50 designates the housing for the reel assembly above described. The housing is provided with a belt opening 52 for the belt 12. The housing is capped at each end by end caps 54 and 56. The end cap 54 is shaped to provide an inwardly extending, annular flange 58, which surrounds the rewind spring 10, while the exterior of the cap is shouldered circumferentially, as seen at 60, to provide in effect a hollow plug fitting the housing end.

Reference has previously been made to fixed locking ring 16, which surrounds the projecting portion 14 of the reel spool. Upon reference to Fig. 2, it will be seen that this ring is provided with two concentric shoulders, outer shoulder 62 and inner shoulder 64. The ring fits into the end of the housing 50, the shoulder 62 abutting the end of the housing.

The end cap 56 of the reel housing extends into the locking ring 16 and is peripherally shouldered, its shoulder abutting the inner shoulder 64 of the locking ring.

66 designates two mounting brackets, one at each end of the reel housing. Each bracket is provided with a flange 68, which is set into a depression 70, with which each of the end caps 54 and 56 is provided. Notches in the housing 50 also match the brackets 66.

The axle for the reel spool is designated 72. This axle, which extends completely through the entire reel assembly, including harness bearing 78 (Fig. 2), end caps, and the mounting brackets, also functions as a tie bolt for holding the parts assembled. The axle is headed at 74 and at its opposite end is provided with a nut 76.

It will be seen from the foregoing that the housing 50 can be slipped over the spool assembly, end caps 54 and 56 and mounting brackets 66 placed in position. The axle 72 may then be threaded through the spool and harness bearing and secured in position by nut 76. This completes assembly. It is obvious that disassembly is just as simple as assembly.

*Operation*

As above mentioned, the unwinding or payout direction of rotation of the reel spool 2 is anti-clockwise, as viewed in Figs. 3 and 4, rewinding, of course, being clockwise. It is understood that the spring 10 rewinds the reel spool, and that unwinding is accomplished by tensioning the belt 12 in excess of the rewinding force of the spring 10.

Under normal conditions, that is to say, with no unwinding or payout force being applied to the belt 12, the parts will assume the positions shown in Fig. 3, the locking pawls 38 and 40 being held in retracted position by their springs 46. It is appreciated, of course, that the reel assembly will be mounted in some fixed position to the seat of an aeroplane, for example, and let it be assumed that the belt 12 is a conventional safety belt for the seat occupant.

Under normal movement of the seat occupant the reel spool 2 will be rotated in a payout or unwinding direction as the seat occupant moves forward, for instance, and will rewind as he moves backward. Under these conditions the locking pawls 38 and 40 will be carried around with the reel spool with no change in the relative positions of the spool and pawls from that illustrated in Fig. 3, the tension of the springs 46 being so selected as to maintain the locking pawls in the positions shown. The spool 2 and locking pawls 38 and 40 will remain in the relative positions shown in Fig. 3 up to a certain predetermined acceleration of the reel spool. Inasmuch as the belt 12 is directly attached to the reel spool, the rate of rotation of the spool in an unwinding direction is directly dependent upon the speed with which the belt is stripped from the reel, and it is quite apparent that up to a predetermined acceleration of the reel spool the locking pawls 38 and 40 will be held in the positions shown in Fig. 3 relative to the reel spool because of the restraining or retaining action of the springs 46. Now let it be assumed that the aeroplane is suddenly decelerated, as in a crash-landing for example. Under these conditions the seat occupant will be thrown forward with the result that a sudden force is applied to the belt 12 and the reel spool will be accelerated; at the same time, of course, force is being applied to the locking pawls 38 and 40 in a direction tending to have them rotate with the spool. However, inasmuch as the springs 46 constitute the only couple between the pawls and the reel spool and inasmuch as the pawls have inertia and, hence, resist rotation with the spool at the assumed accelerated rate of rotation of the spool, the reel spool will turn relatively to the pawls as illustrated in Fig. 4, the shape of the grooves 20 and 22 permitting of this movement. Under these conditions it will be appreciated, by comparing Figs. 3 and 4, that the contact of the spool with the corner 44 of each locking pawl at the sockets 36 will positively effect a swinging or pivoting of the pawl as well as outward movement of the pawls as the sockets move from the positions shown in Fig. 3 to the positions shown in Fig. 4. In this movement of the locking pawls it will be understood that the springs 46 will elongate as shown in Fig. 4. This pivoting and outward movement of the pawls is almost instantaneous, and the extent of movement is sufficient to carry the pawls outwardly into engagement with the teeth 18 of the stationary locking ring 16. Likewise, it is to be noted that the amount of movement of the reel spool necessary to project the locking pawls into locking position is enough to close the gap between the edges 34 of each of the grooves 20 and 22 and the adjacent edge of the locking pawls, so that, with the pawls in engagement with the locking teeth, rotation of the reel spool in an unwinding direction is positively prevented.

From all of the foregoing it will be seen that this invention provides a reel which is extremely simple in construction and positive in operation, locking of the reel against rotation in an unwinding direction at a predetermined acceleration of the reel being positively effected.

It is to be understood that changes may be made in the details of construction and arrangement of parts hereinabove described within the purview of the invention.

What is claimed is:

1. A device of the class described comprising, in combination, a rotatable reel spool; a rewind spring for said spool; locking pawls carried by the spool; a cooperating locking ring encircling the spool; a tubular housing for said elements, said locking ring having a peripheral flange for engaging one end of said housing to hold the ring against displacement inwardly of the housing; an end cap at this end of the housing having a peripheral flange abutting said locking ring; an end cap extending into the opposite end of said housing and surrounding said spring, said cap having a peripheral flange abutting the housing end; and a bolt extending through the complete assembly to hold the parts in assembled relation, said bolt extending axially of the spool and functioning as an axle for the spool.

2. A safety reel comprising, in combination, a rotatable spool; a groove in one end of said spool, said groove extending from one edge of the spool end transversely of the spool end, said groove terminating short of the opposite edge of the spool end; a fixed, non-rotatable locking ring encircling the grooved end of the spool; a pawl pivotally mounted within said groove with its outer end adjacent but out of engagement with said locking ring; yielding means attached to the pawl and to the spool end for holding the inner end of said pawl in engagement with the inner end of said groove, said spool and pawl moving together in fixed relation during normal rotation of the spool, predetermined acceleration of the spool effecting rotation of the spool relative to said pawl due to the inertia of the pawl, said groove being so positioned in said spool that said rotation of the spool relative to the pawl will effect pivoting of the pawl in said groove in a direction opposed to the direction of rotation of the spool to project the outer end of the pawl into engagement with said locking ring to stop rotation of the spool.

3. A safety reel comprising, in combination, a rotatable spool; a groove in one end of said spool, closed at its inner end and extending from one edge of the spool end transversely of the spool end; a fixed locking ring encircling the grooved end of the spool; a pawl pivotally mounted within said groove with its outer end adjacent the said locking ring; and a spring attached to the spool end and to said pawl adjacent the inner end of the pawl for maintaining the inner end of said pawl in engagement with the closed end of said groove, said spool and pawl moving in fixed relation to each other during normal rotation of the spool, abnormal acceleration of the spool effecting rotation of the spool relative to the pawl due to the inertia of the pawl, said groove being so positioned in the spool end that said acceleration of the spool will effect positive pivoting of the pawl in said groove in a direction opposed to the direction of rotation of the spool to bring its outer end of the pawl into engagement with said fixed locking ring to stop rotation of the spool.

4. A safety reel comprising, in combination, a rotatable spool; a groove in one end of said spool, closed at its inner end and extending from one edge of the spool end transversely of the spool end; a fixed, internally toothed, non-rotatable locking ring encircling the grooved end of said spool; a pawl pivotally mounted within said groove with its outer end adjacent the said locking ring; and a tension spring having one end attached to the spool end and its other end attached to said pawl toward the inner end of the pawl to maintain the inner end of said pawl in engagement with the closed inner end of the groove, said pawl and spool moving in fixed relation to each other during normal rotation of said spool, abnormal acceleration of the spool effecting rotation of the spool relative to the pawl due to the inertia of the pawl, said groove being so positioned in the spool end that said acceleration of the spool will effect pivoting of the pawl in said groove in a direction opposed to the direction of rotation of the spool to project the outer end of the pawl into engagement with the teeth of said fixed locking ring to stop rotation of the spool.

References Cited in the file of this patent

UNITED STATES PATENTS

| | | |
|---|---|---|
| 318,212 | Shaw | May 19, 1885 |
| 477,634 | Beile | June 28, 1892 |
| 2,105,469 | Bosch | Jan. 18, 1938 |
| 2,843,335 | Hoven et al. | July 15, 1958 |